United States Patent
Childress et al.

(10) Patent No.: US 11,662,993 B2
(45) Date of Patent: May 30, 2023

(54) AUTONOMOUS MANAGEMENT OF TEMPORAL UPDATES AND ROLLBACKS

(71) Applicant: KYNDRYL, INC., New York, NY (US)

(72) Inventors: Rhonda L. Childress, Austin, TX (US); Martin G. Keen, Cary, NC (US); Jeremy R. Fox, Georgetown, TX (US); Michael Bender, Rye Brook, NY (US)

(73) Assignee: Kyndryl, Inc., New York, NY (US)

( * ) Notice: Subject to any disclaimer, the term of this patent is extended or adjusted under 35 U.S.C. 154(b) by 79 days.

(21) Appl. No.: 17/323,216

(22) Filed: May 18, 2021

(65) Prior Publication Data

US 2022/0374220 A1    Nov. 24, 2022

(51) Int. Cl.
*G06F 8/65* (2018.01)
*H04L 9/06* (2006.01)
*H04L 9/00* (2022.01)

(52) U.S. Cl.
CPC .............. *G06F 8/65* (2013.01); *H04L 9/0618* (2013.01); *H04L 9/50* (2022.05)

(58) Field of Classification Search
USPC ....................................................... 717/170
See application file for complete search history.

(56) References Cited

U.S. PATENT DOCUMENTS

| | | | |
|---|---|---|---|
| 9,715,378 B2 | 7/2017 | Dickerson | |
| 9,787,800 B2 | 10/2017 | E Costa | |
| 9,886,266 B2 | 2/2018 | Garratt | |
| 9,952,840 B2 | 4/2018 | Baumgart | |
| 9,952,850 B2 | 4/2018 | Joshi | |
| 10,191,732 B2 | 1/2019 | Kludy | |
| 10,338,912 B2 | 7/2019 | Dahan | |
| 10,505,822 B2 | 12/2019 | Blakeman | |
| 10,626,151 B2 | 4/2020 | Bowen | |
| 10,628,151 B2 | 4/2020 | Weilnau | |
| 10,666,767 B1* | 5/2020 | Floyd | B60W 50/0205 |
| 11,106,452 B2* | 8/2021 | de Jong | H04L 67/34 |
| 11,138,314 B1* | 10/2021 | Gettys | H04L 9/3239 |
| 2010/0318986 A1 | 12/2010 | Burke | |
| 2011/0296248 A1 | 12/2011 | Vidal | |
| 2018/0285086 A1* | 10/2018 | O'Malley | G06F 8/65 |
| 2020/0004966 A1 | 1/2020 | Mohinder | |
| 2020/0081697 A1 | 3/2020 | Sillankorva | |

(Continued)

FOREIGN PATENT DOCUMENTS

JP    6216730 B2    10/2017

OTHER PUBLICATIONS

Aran Davies; "How To Use Blockchain To Secure Your Code?"; devteam.space website [full URL in ref.]; Mar. 12, 2019 (Year: 2019).*

(Continued)

*Primary Examiner* — Wei Y Zhen
*Assistant Examiner* — Clint Thatcher

(57) ABSTRACT

A processor may load one or more potential updates to a trusted source from an identified trusted source. The processor may determine acceptable update windows. The processor may apply at least one of the one or more potential updates to the computing device. The processor may identify if a steady state has been reached. The processor may determine whether the at least one update has succeeded.

13 Claims, 5 Drawing Sheets

(56) References Cited

U.S. PATENT DOCUMENTS

| | | | |
|---|---|---|---|
| 2020/0160289 A1 | 5/2020 | Mahajan | |
| 2021/0048999 A1 | 2/2021 | Bregman | |
| 2021/0149663 A1* | 5/2021 | Zhang | H04L 9/3247 |
| 2022/0188090 A1* | 6/2022 | Tsfasman | G06F 8/61 |
| 2022/0207022 A1* | 6/2022 | Wood | G06F 16/2379 |

OTHER PUBLICATIONS

Bauwens, et al., "Over-The-Air Software Updates in the Internet-Of-Things: An Overview of Key Principles." Published Feb. 14, 2020. 7 pages. In IEEE Communications Magazine, vol. 58, No. 2, pp. 35-41 Published by IEEE. https://ieeexplore.ieee.org/document/8999425.

Chandramouli, et al., "Faster: A Concurrent Key-Value Store With In-Place Updates." Pubishes May 2018. 16 pages. In Proceedings of the 2018 International Conference on Management of Data (SIGMOD '18). Association for Computing Machinery, New York, NY, USA, 275-290. https://doi.org/10.1145/3183713.3196898.

Kachman, "Effective Multiplatform Firmware Update Process For Embedded Low-Power Devices." Published in 2019 6 pages. Published in Information Sciences and Technologies Bulletin of the ACM Slovakia, vol. 11, No. 1. pp 6-11.

Kornaros, et al., "Securing Dynamic Firmware Updates of Mixed-Critical Applications." Published Jul. 20, 2017. 7 pages. In 2017 3rd IEEE International Conference on Cybernetics (CYBCONF), 2017, pp. 1-7. Published by IEEE, https://ieeexplore.ieee.org/document/7985807.

Mell, et al., "The NIST Definition of Cloud Computing," Recommendations of the National Institute of Standards and Technology, U.S. Department of Commerce, Special Publication 800-145, Sep. 2011, 7 pgs.

Zandberg, et al., "Secure Firmware Updates For Constrained IoT Devices Using Open Standards: A Reality Check." Published Nov. 6, 2019. 14 pages. In IEEE Access, IEEE, 2019, 7, pp. 71907-71920, https://hal.inria.fr/hal-02351794.

Aslan, Turgut., "Security patch management in the cloud." Published Feb. 7, 2012. 9 pages. Published by IBM. https://www.ibm.com/blogs/cloud-computing/2012/02/07/security-patch-management-in-the-cloud/.

* cited by examiner

AUTONOMOUS MANAGEMENT OF TEMPORAL UPDATES AND ROLLBACKS

BACKGROUND

The present disclosure relates generally to the field of temporal updates and rollbacks, and more specifically to managing software and firmware updates to a computing device.

Software and firmware updates are critical to keeping applications running efficiently and securely. Additionally, the timing and efficiency of updates is critical to ensure that those same applications do not experience problems due to poorly timed updates or low-suitability updates.

SUMMARY

Embodiments of the present disclosure include a method, computer program product, and system to manage software and firmware updates to a computing device. A processor may load one or more potential updates to a trusted source from an identified trusted source. The processor may determine acceptable update windows. The processor may apply at least one of the one or more potential updates to the computing device. The processor may identify if a steady state has been reached. The processor may determine whether the at least one update has succeeded.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
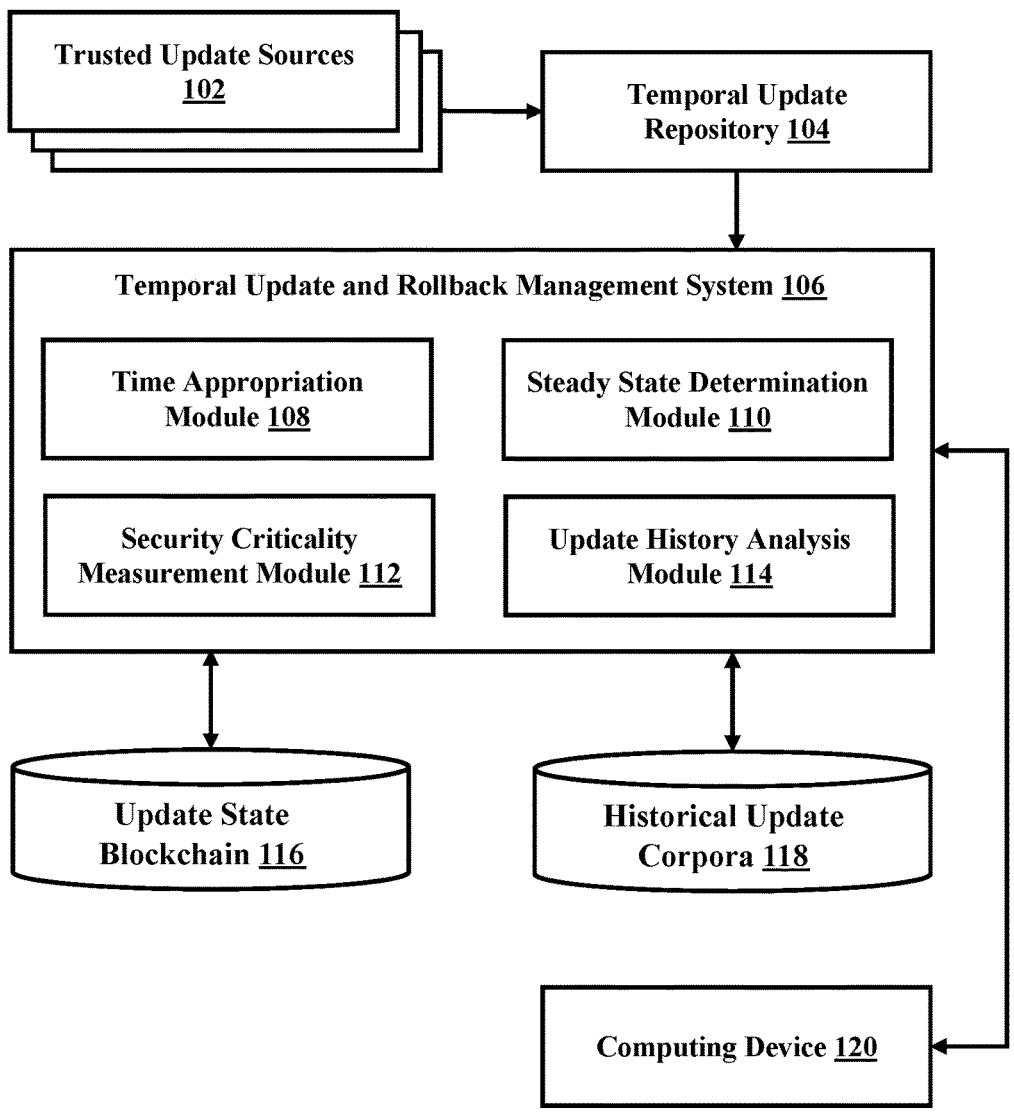
FIG. 1 illustrates a block diagram of an exemplary network to manage software and firmware updates to a computing device, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of temporal updates and rollbacks, and more specifically to managing software and firmware updates to a computing device. While the present disclosure is not necessarily limited to such applications, various aspects of the disclosure may be appreciated through a discussion of various examples using this context.

Software and firmware updates are critical to keeping applications running efficiently and securely. However, the timing and efficiency of updates is critical to ensure that those same applications do not experience problems due to poorly timed updates or low-suitability updates.

Accordingly, described herein is a novel solution that: monitors applications and devices to determine when updates can be applied without impacts; determines if an update has caused negative effects; and allows updates to come only from a trusted source that can also backout/rollback the updates to a previously trusted version when negative effects have been determined to have occurred.

It is noted that the solution described herein improves computing capabilities of a computing device and is necessary for almost all computing devices as security patch management is a crucial task affecting all enterprises. In fact, no shipped software is free of errors and vulnerabilities, which can, and are, being exploited daily. The described solution thus provides a method to monitor and tailor software updates based upon historical analysis and modeling of an existing system or device. In some embodiments, the solution provided herein may be implemented on an offering, such as, IBM's Tivoli Provisioning Manager that automates software updates across provisioned images.

Before turning to the FIGS., it is noted that the novel solution may be split into multiple methods that can be used individually, altogether, or in any combination thereof. Accordingly, the described methods are:

A method to load potential updates: this step teaches how to load potential updates to a secure source. In such an embodiment, an organization (e.g., company, developer, etc.) identifies a trusted source for each software/firmware update into a system, and the disclosed system (e.g., to be discussed more fully in regard to FIG. 1) extracts updates into the trusted source for potential loading;

A method to determine appropriate time to update: this step teaches how to determine acceptable timeframes for updating software/firmware based on defined windows and historical problems and backouts. In some embodiments, the system determines acceptable time windows from configurations for each device (e.g., when is device most operational, what kind of device [server, personal computer, smartphone, etc.]). The system may use machine learning to determine when previous updates have been backed out and how fast they were backed out. The system may determine a high-risk window based on problem backouts and identifies those windows as less desirable windows to update (though they can be done if no other window is available). The system may determine the criticality of an update (e.g., using natural language processing [NLP] based on vendor information loaded into a trusted storage location). The system may prioritize windows and select a top-rated window based on risks (slowing of processing, likelihood of a backout) and criticality;

A method to install updates: this step teaches installing the updates and logging the transaction (e.g., installing of the updates) into a blockchain. The system may extract updates from the trusted source at the prioritized time. The system may log update information into a blockchain, and they system may install the update(s); and A method to determine steady state: this step teaches determining the success of the update. The system may compare (e.g., I/O, computing, etc.) transaction rates from prior to the update to post-update to determine if changes have occurred. The system may use NLP to determine if the update was expected to change transaction volumes or throughput/speed. The system may compare actual changes to expected changes (e.g., using NLP a line of code should read a particular way but is missing a semicolon, or a new library is to be used, but is not accessible, etc.). In some embodiments, if there is variance, the system may determine how great the variance is (e.g., based on a number of standard deviations). In some embodiments, if variance is greater than acceptable/an acceptable threshold, the system may backout changes and/or add a block to the blockchain to designate failure. In some embodiments, if a user (e.g., customer) initiates a backout manually, the system adds a block to the blockchain to designate failure. In some embodiments, if no problems are identified until a steady state time is reached, the update to the computing device is determined to be success. In some embodiments, if the update is determined to be a failure, the system may backout the update to a previously acceptable steady state.

Referring now to FIG. 1, illustrated is a block diagram of an exemplary network 100 to manage software and firmware updates to a computing device 120, in accordance with aspects of the present disclosure. As depicted, the system 100 includes trusted update sources 102, a temporal update repository 104, a temporal update and rollback management system 106, an update state blockchain 116, a historical update corpora 118, and a the computer device 120. In some embodiments, the temporal update and rollback management system 106 includes a time appropriation module 108, a steady state determination module 110, a security criticality measure module 112, and an update history analysis module 114.

In some embodiments, the trusted update sources 102 or a trusted update source of the trusted update sources 102 issue an update that should be used to update the computing device 120. The update may be communicated with the temporal update repository 104, which communicates with the temporal update and rollback management system 106 and relays a proposed time/timeframe/window to apply the update to the computing device 120.

In some embodiments, the temporal update and rollback management system 106 utilizes the time appropriation module 108 to identify/determine an appropriate time/timeframe in which to apply the update. The time appropriation module 108 may utilize the update history analysis module 114 to access the historical update corpora 118 (or access the historical update corpora 118 itself) and the update history analysis module 114 (or the historical update corpora 118) may analyze historical update data to find a likely time to apply the update. For example, analysis of the historical update corpora 118 may indicate that a majority of previous updates to the computing device 120 were applied between 3 a.m. and 4 a.m. As another example, analysis of the historical update corpora 118 may indicate that the computing device 120 is less likely to have any computing slow down or hinderances between noon and 1 p.m., etc.

In some embodiments, the time appropriation module 108 may (additionally) communicate with the security criticality measurement module 112 to identify/determine a criticality of an update and depending on the criticality of the update, the time/timeframe determined by the time appropriation module may be increased or decreased. For example, one update may involve fixing a security flaw in an application on the computing device 120, and another update may involve updating a keyboard application. The security criticality may determine that the keyboard application still works without the update and that the security flaw should be immediately address. Accordingly, the time appropriation module 108 may prioritize the security flaw update before the keyboard update (e.g., first available timeframe for updating is given to the security flaw update).

In some embodiments, the update may be applied to the computing device 120 and the steady state determination module 110 will determine/identify if the update/computing device 120 is at a steady state (or if the computing device 120 is experiencing any negative effects after the update). If the update/computing device 120 is not at a steady state, the update may be rolled back/backed out, where a previous version of the application that is updated is put back on the computing device 120, or the computing device 120 is rolled back/backed out to a last, previous steady state. The previous version of the application may be found in the historical update corpora 118. If the update/computing device is at a steady state, the historical update corpora 118 and/or the update state blockchain 116 are updated to indicate the update was successful and completed. In some embodiments, a rollback/backout can be included in the historical update corpora 118 and/or the update state blockchain 116, which can help the temporal update and rollback management system 106 to determine/identify times/timeframes that are best/optimal for applying subsequent updates to the computing device 120.

As a use cases, the temporal update and rollback management system 106 may receive a major firmware update, received overnight from a trusted update source (e.g., a verified developer, owner of an application, etc.) of the trusted update sources 102. The update source may recommend immediate installation. The temporal update and rollback management system 106 would determine (using any combination of the modules 108-114) that the update will affect the computing device 120 with peak workload in the next four hours and therefore defers the update until a low throughput steady state is reached.

As another use case, the temporal update and rollback management system 106 may receive a x.x.1 software update from a trusted update source of the trusted update sources 102. The temporal update and rollback management system 106 may derive that the update applies to a little used function of the computing device 120. Additionally, the temporal update and rollback management system 106 may derive that a previous update to this functionality caused an outage with a related computing function. The temporal update and rollback management system 106 may then elect to defer the update for manual investigation whereby the update will either be applied at a later time upon approval by a user/administrator/controller, or skipped entirely.

Figure 2:
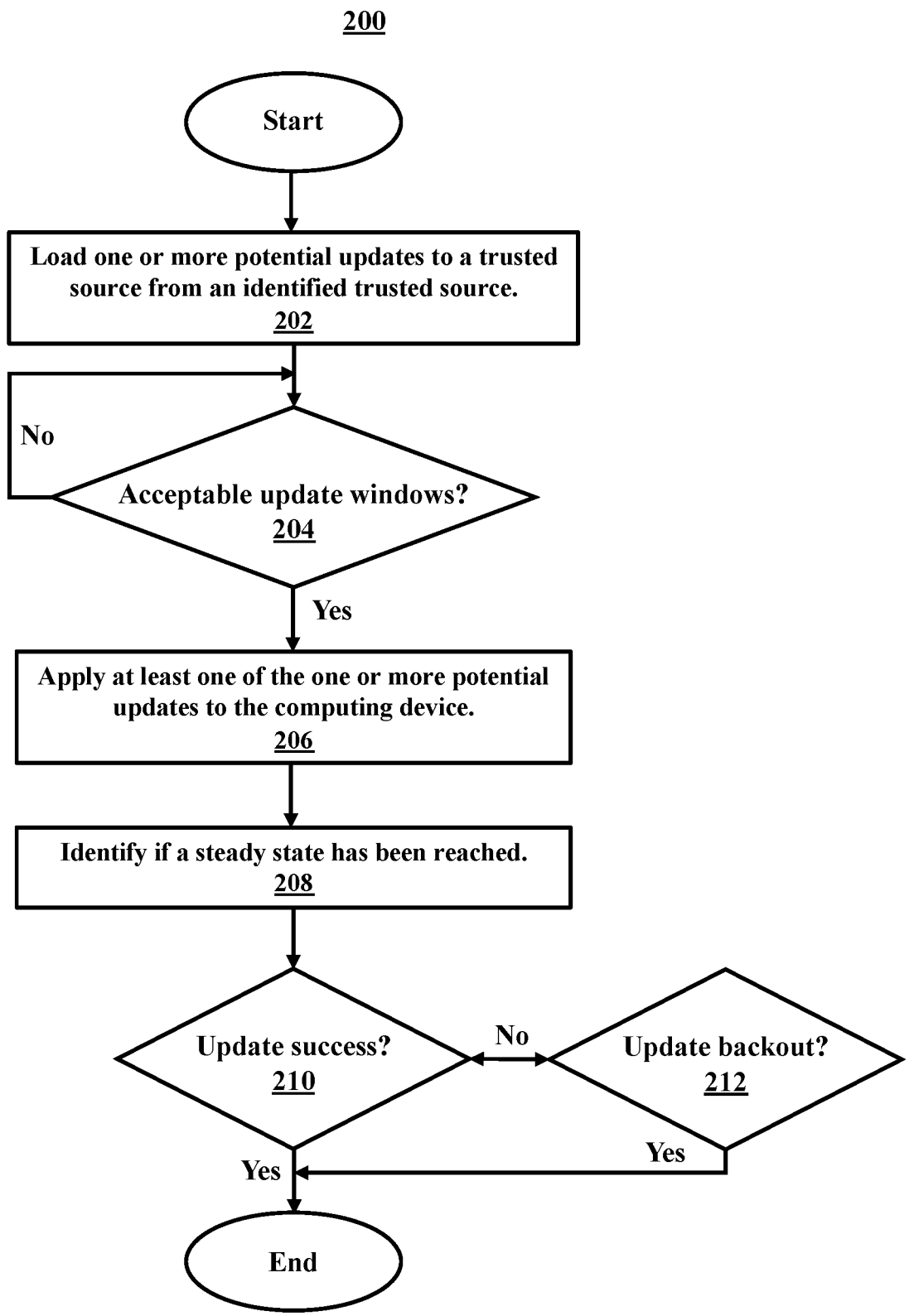
FIG. 2 illustrates a flowchart of an exemplary method to manage software and firmware updates to a computing device, in accordance with aspects of the present disclosure.

Referring now to FIG. 2, illustrated is a flowchart of an exemplary method 200 to manage software and firmware updates to a computing device, in accordance with aspects of the present disclosure. In some embodiments, the method 200 may be performed by a processor (e.g., of the network 100 of FIG. 1, of the temporal update and rollback management system 106, of the computing device 120, etc.).

In some embodiments, the method 200 begins at operation 202, where the processor loads one or more potential updates to a trusted source from an identified trusted source. The method 200, may proceed to decision block 204, where the processor may determine acceptable update windows. If, at decision block 204, no acceptable update window is determined, the method 200 may continue to look for an acceptable update window at decision block 204.

If, at decision block 204, an acceptable update window is determined, the method 200 may proceed to operation 206, where the processor may apply at least one of the one or more potential updates to the computing device. In some embodiments, the method 200 may proceed to operation 208, where the processor may identify if a steady state has been reached (e.g., by identifying if a threshold has been reached, by identifying if a program is working properly, etc.).

In some embodiments, the method 200 may proceed to decision block 210, where the processor may determine whether the at least one update has succeeded. If, at decision block 210, it is determined that the at least one update has succeeded (e.g., reached a steady state and there are no issues with the running of the updated application, etc.), the method 200 may end. If, at decision block 210, it is determined that the update was not successful, the method 200 may proceed to decision block 212, where the processor determines if the update was backed out.

If, at decision block 212, it is determined that the updated was backed out, the method 200 may end. In some embodiments, if, at decision block 212, it is determined that the update was not backed out, the method 200 may proceed (back) to decision block 212. It is noted that decision blocks 210 and 212 may be operations that are performed simultaneously and/or can be reversed, e.g., the operation of decision block 212 can be performed before the operation of decision block 210. Further noted is that either operations of decision blocks 210 or 212 may only be performed if one of the operations of decision blocks 210 or 212 are indicated as not being successful or backed out, e.g., if it is determined that an update is successful at decision block 210, the operation of decision block 212 may not be performed at all, or if the update is determined to be backed out at decision block 212, the operation of decision block 210 may not be performed at all.

In some embodiments, discussed below, there are one or more operations of the method 200 not depicted for the sake of brevity and which are discussed throughout this disclosure. Accordingly, in some embodiments, the processor may utilize a cognitive analysis (e.g., NLP, machine learning, etc.) of historical updates to identify a threshold for backing out updates (e.g., most updates are backed out if tried to be performed during peak operational hours of a computing device, etc.).

In some embodiments, the processor may load a blockchain to be the trusted source from one or more identified update sources (e.g., due to the immutable nature of a blockchain, the blockchain may be used as a verifiable [blockchain allows for a trusted authority/company/developer to be verified] and trusted source for applying and/or recording updates). In some embodiments, determining the acceptable update windows includes the processor utilizing a cognitive analysis of historical updates.

In some embodiments, the processor may update the computing device and log the update(s) in/on the blockchain. In some embodiments, the processor may analyze one or more response changes to the computing device from before a change from the at least one update to after the at least one update. In some embodiments, analyzing the one or more response changes include the processor comparing expected response changes to actual response changes and identifying if there is a threshold variance (e.g., transactions not being completed at a certain rate, more than three coding mistakes, etc.).

In some embodiments, the processor may declare the at least one update as needing to backout (e.g., by the update meeting or exceeding the threshold variance), or the processor may declare the at least one update as a success (e.g., by falling below the threshold variance). In some embodiments, if the at least one update is declared as needing to backout, the processor may identify at least one (previously successful) steady state and revert to a backout.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
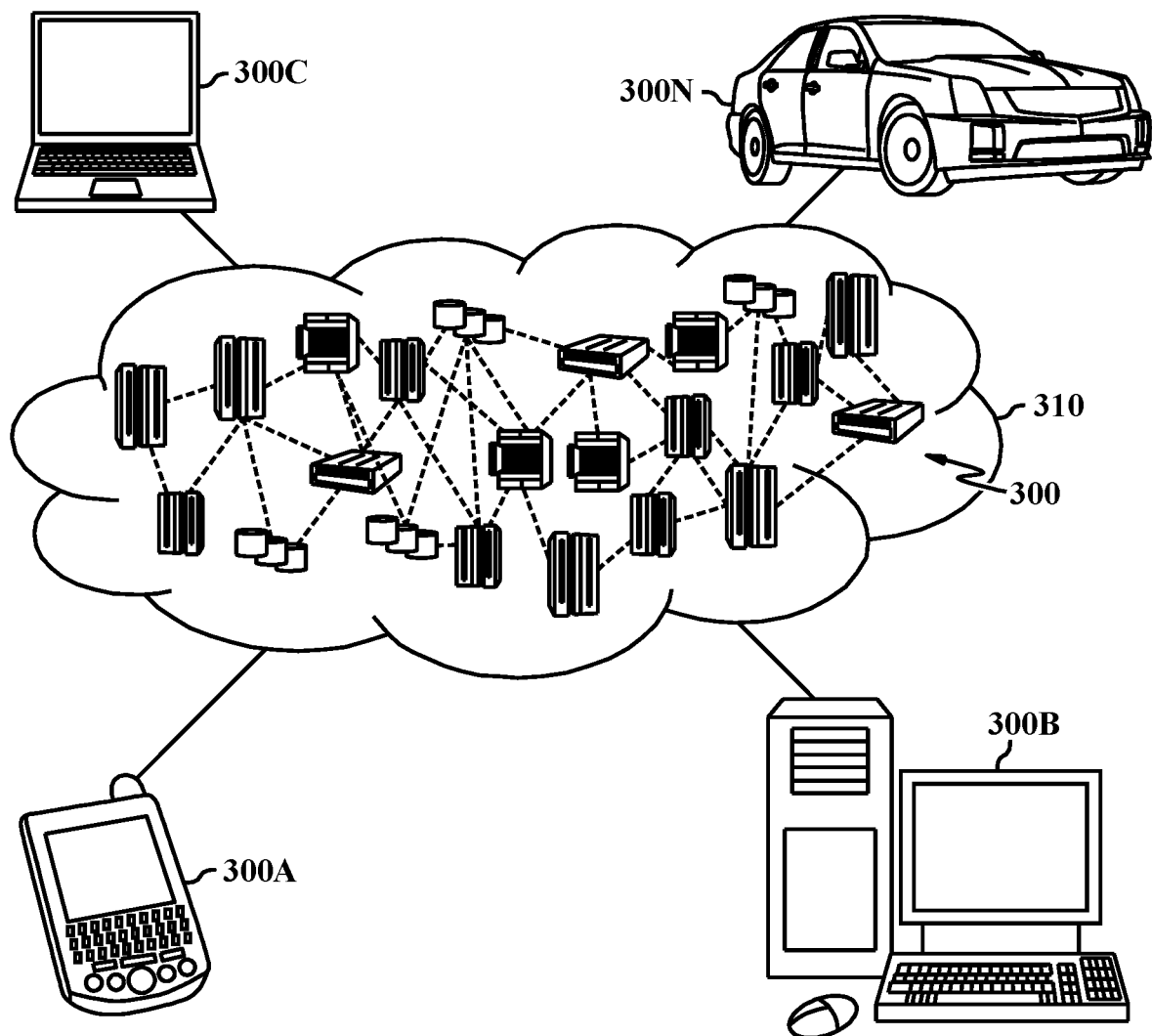
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
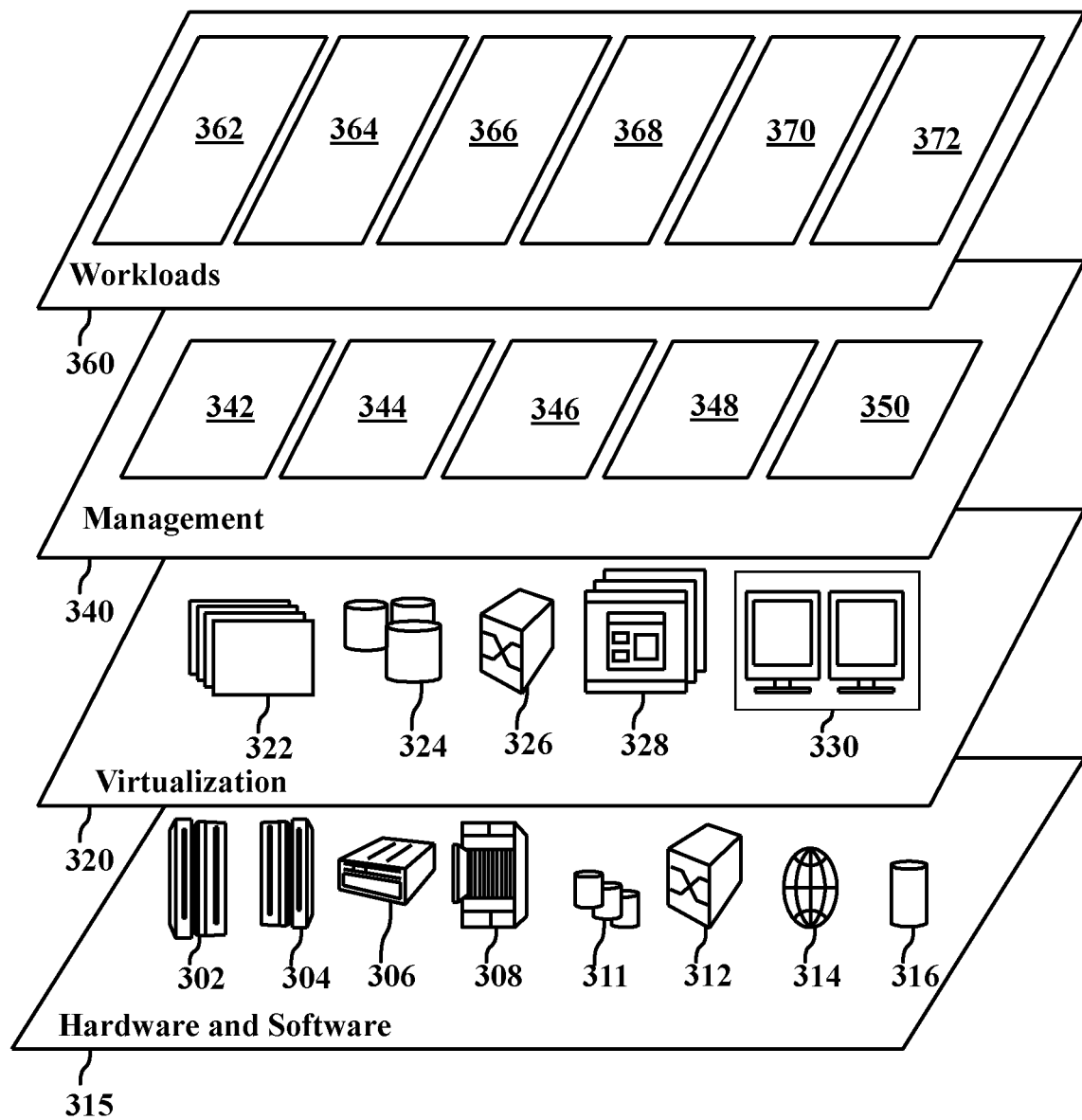
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and managing software and firmware updates to a computing device 372.

Figure 4:
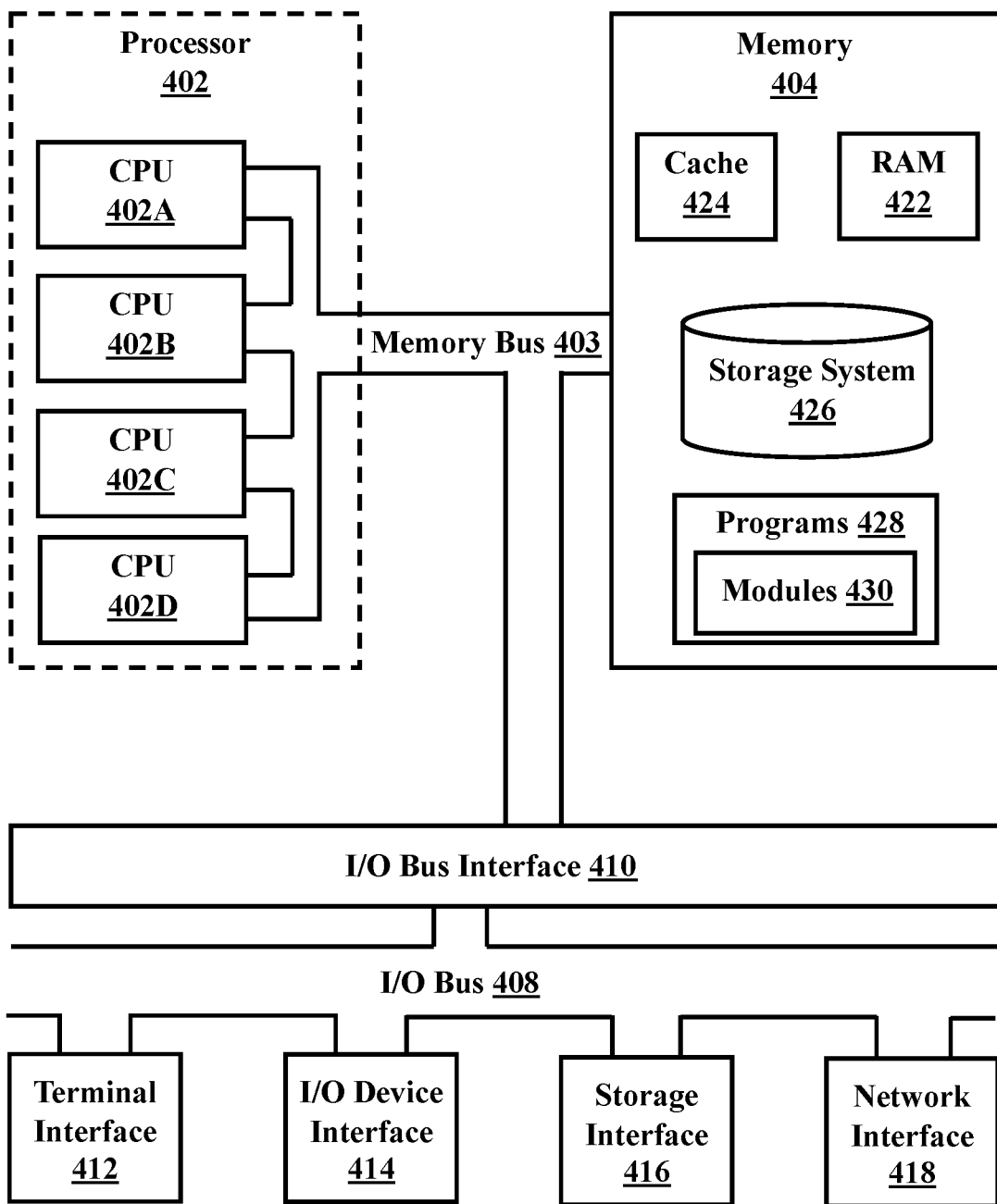
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computing device, comprising:
a memory; and
a processor that when executing instructions stored in the memory is configured to:
load one or more potential updates to a trusted source from an identified trusted source;
identify an acceptable window for an update of the computing device;
apply at least one potential update, of the one or more potential updates, to the computing device during the window to update the computing device;
analyze changes in a response of the computing device during a period from before a change resulting from the update to after the update;
compare an expected change in a response of the computing device to actual changes based on the analysis; and
identify whether the update is successful based on a determination of whether the computing device is operating at a steady state,
wherein, if the actual changes are less than a threshold variance identified based on the comparison, then the update is determined to be operating at the steady state, and
wherein if the update is determined to be unsuccessful, then the processor is further configured to:
identify whether the update was backed out based on a threshold value determined using a cognitive analysis of historical updates.

2. The computing device of claim 1, wherein the identified trusted source is a blockchain loaded from a trusted update source.

3. The computing device of claim 1, wherein, when the processor is configured to identify the window, the processor is further configured to:
identify the window based on a cognitive analysis of historical updates.

4. The computing device of claim 1, wherein the processor is configured to:
log the update in a blockchain.

5. The computing device of claim 1, wherein the processor is configured to:
identify that the update needs to backout based on the threshold variance;
identify a last steady state; and
revert to a backout.

6. A method, comprising:
   loading, by a computer device, one or more potential updates to a trusted source from an identified trusted source;
   identifying, by the computer device, an acceptable window for an update of the computing device;
   applying, by the computer device, at least one potential update, of the one or more potential updates, to the computer device during the window to update the computer device;
   analyzing, by the computer device, changes in a response of the computing device during a period from before a change resulting from the update to after the update;
   comparing, by the computer device, an expected change in a response of the computing device to actual changes based on the analysis; and
   identifying, by the computer device, whether the update is successful based on a determining of whether the computing device is operating at a steady state,
      wherein, if the actual changes are less than a threshold variance identified based on the comparison, then the update is determined to be operating at the steady state, and
      wherein if the update is determined to be unsuccessful, then the method further comprises:
         identifying, by the computer device, whether the update was backed out based on a threshold value determined using a cognitive analysis of historical updates.

7. The method of claim 6, wherein the identified trusted source is a blockchain loaded from a trusted update source.

8. The method of claim 6, wherein the identifying the window further comprises:
   identifying the window based on a cognitive analysis of historical updates.

9. The method of claim 6, further comprising:
   logging the update in a blockchain.

10. The method of claim 6, further comprising:
    identifying that the update needs to backout based on the threshold variance.

11. The method of claim 10, further comprising:
    identifying a last steady state; and
    reverting to a backout.

12. A non-transitory computer readable medium storage storing instructions that when executed by a processor to cause the processor to perform:
    loading one or more potential updates to a trusted source from an identified trusted source;
    identifying an acceptable window for an update of the computing device;
    applying at least one potential update, of the one or more potential updates, to the computing device during the window to update the computing device;
    analyzing changes in a response of the computing device during a period from before a change resulting from the update to after the update;
    comparing an expected change in a response of the computing device to actual changes based on the analysis; and
    identifying whether the update is successful based on a determining of whether the computing device is operating at a steady state,
       wherein, if the actual changes are less than a threshold variance identified based on the comparison, then the update is determined to be operating at the steady state, and
       wherein if the update is determined to be unsuccessful, then the instructions further cause the processor to perform:
          identifying whether the update was backed out based on a threshold value determined using a cognitive analysis of historical updates.

13. The non-transitory computer readable medium of claim 12, wherein the identified trusted source is a blockchain loaded from a trusted update source.

* * * * *